(12) United States Patent
Diec

(10) Patent No.: US 6,604,128 B2
(45) Date of Patent: *Aug. 5, 2003

(54) METHOD AND SYSTEM FOR DISTRIBUTING OBJECTS OVER A NETWORK

(75) Inventor: Thanh Diec, Sunnyvale, CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/983,064

(22) Filed: Oct. 23, 2001

(65) Prior Publication Data

US 2002/0042843 A1 Apr. 11, 2002

Related U.S. Application Data

(63) Continuation of application No. 09/451,487, filed on Nov. 30, 1999, now Pat. No. 6,324,568.

(51) Int. Cl.$^7$ ............................................. G06F 15/16
(52) U.S. Cl. ....................................... 709/203; 709/227
(58) Field of Search ................................ 709/203, 227, 709/230, 200, 217, 219, 218, 228

(56) References Cited

U.S. PATENT DOCUMENTS

| | | | | |
|---|---|---|---|---|
| 5,634,006 A | * | 5/1997 | Baugher et al. | 709/228 |
| 5,859,971 A | * | 1/1999 | Bittinger et al. | 709/203 |
| 5,867,661 A | * | 2/1999 | Bittinger et al. | 709/227 |
| 6,012,067 A | * | 1/2000 | Sarkar | 707/103 |
| 6,112,242 A | * | 8/2000 | Jois et al. | 709/225 |
| 6,138,152 A | * | 10/2000 | Jalote et al. | 709/219 |
| 6,161,123 A | * | 12/2000 | Renouard et al. | 709/203 |
| 6,233,543 B1 | * | 5/2001 | Butts et al. | 703/27 |
| 6,324,568 B1 | * | 11/2001 | Diec | 709/203 |
| 6,397,253 B1 | * | 5/2002 | Quinlan et al. | 709/227 |
| 6,456,308 B1 | * | 9/2002 | Agranat et al. | 345/854 |

OTHER PUBLICATIONS

Forta, Ben, "The COLDFUSION web application construction kit", (1998), Table of Contents, pp 32–35 and Appendix A (pp790–872).

"CGI: Common Gateway Interface," http://www.w3.org/DGI/, (Printed from Website on Nov. 5, 1999), p 1–2.

"CGI: Common Gateway Interface," http://www.hoohoo.ncsa.uiuc.edu/cgi8/primer.html, (Printed from Website on Nov. 5, 1999), p 1–13.

"Common Gateway Interface RFC Project Page," http://Web.Golux.Com/coar/cgi, (Printed from Website on Nov. 5, 1999), p 1–3.

"CGI Environment Variables," http://hoohoo.ncsa,uiuc.edu/cgi/env.html, (Printed from Website on Nov. 5, 1999), p 1–7.

"CGI Command line options," http://hoohoo.ncsa,uiuc.edu/cgi/cl.html, (Printed from Website on Nov. 5, 1999), p 1.

"CGI Environment Variables," http://hoohoo.ncsa.uiuc.edu/cgi/env.html, (Printed from Website on Nov. 5, 1999), p 1–3.

"CGI Script Input," http://hoohoo.ncsa,uiuc.edu/cgi/in.html, (Printed from Website on Nov. 5, 1999), p 1.

(List continued on next page.)

Primary Examiner—Frantz B. Jean
(74) Attorney, Agent, or Firm—James W. Soong; Perkins Coie LLP

(57) ABSTRACT

A method and system for passing information between a client, as a browser, and a server, as an application server, where the information is passed through a web server for processing between the application server and the browser. The webserver loads one or more template files. These template files contain standard markup language plus special tags. These tags are parsed, translated into commands for the application server, and sent to the application server. The application server returns the objects called to the web server, which passes the called objects to the client. The session is persistent.

19 Claims, 3 Drawing Sheets

OTHER PUBLICATIONS

"CGI Script Output," http://hoohoo.ncsa,uiuc.edu/cgi/out.html, (Printed from Website on Nov. 5, 1999), p 1–2.

"Common Gateway Interface," http://hoohoo.ncsa,uiuc.edu/cgi/intro.html, (Printed from Website on Nov. 5, 1999), p 1–2.

"Mosaic for X version 2.0 fill–Out Form Support," wysiwyg://196/http://www.ncsa.uiuc../Docs/fill–out–forms/overview.html,(Printed from Website on Nov. 5, 1999), p 1–6.

"Decoding FORMs with CGI," http://hoohoo.ncsa,uiuc.edu/cgi/forms.html, (Printed from Website on Nov. 5, 1999), p 1–2.

* cited by examiner

METHOD AND SYSTEM FOR DISTRIBUTING OBJECTS OVER A NETWORK

CROSS-REFERENCE TO RELATED APPLICATIONS

This application is a continuation of application Ser. No. 09/451,487, now U.S. Pat. No. 6,324,568 filed Nov. 30, 1999, the entire content of which is hereby incorporated by reference.

FIELD OF THE INVENTION

The invention relates to client-server systems, and especially to web based client-web server-application server systems for delivering object data from the application server through the web server to the client.

BACKGROUND OF THE INVENTION

Normally, web communications, including data requests and data delivery, are carried out in the TCP/IP (Transmission Control Protocol/Internet Protocol) environment via a CGI (Common Gateway Interface) application. The Web page displayed on the client browser is linked to the CGI application in a remote server through a URL (Universal Resource Locator) embedded in the Web Page. The end user at the client clicks on the URL, which launches the CGI application on the Web Server, and causes a form, typically in HTML or XML format, to be delivered to the end-user at the client. The end user at the client supplies the requested information, as a search request, an order, a user id and password, or the like, and sends the data back to the CGI program. The "send" operation, typically a mouse click on a virtual pushbutton on the screen, terminates the CGI session. That is, the CGI session is not persistent.

Meanwhile, the CGI application translates the query or information into a form or format understandable by an application running on an application server. The application server, or more specifically, the application running on the application server, can be a database application or an e-commerce application, or the like. The web server sends the query or information to the application server. The application server performs the requested task, as a database search, an order entry, or the like, and transmits a response back to the CGI application. The CGI application receives the response, translates the response, formats or reformats the response into a markup language format, initiates a new session with the client, and sends the markup language formatted information back to the client.

Within the limits of markup languages, as HTML, DHTML, XML, and the like, this is satisfactory. However, it is frequently necessary to preserve the logic, metadata, or schema of the transmitted information sent by the application server. This requires persistence across multiple requests, special tags, translation of the special tags, and the ability to send and receive objects not supported by markup languages.

SUMMARY OF THE INVENTION

According to the invention there is provided a method and system for passing information between a client and an application server through a web server using a markup language. The system and method include a browser running on the client for an end user to enter information for the application server and receive information from the application server, where the application server contains application resources, as database management system and data, or an e-commerce application. The web server provides communications between the application server and the browser, and includes an interface application running on the web server. The interface application sends a markup language form with encoded metadata information in standard markup language form to the client, and receives information, including responses to the encoded metadata information, from the client. The interface on the web server sends information to the application server based upon the information received from the client and information in response to the encoded metadata information. These are translated into a form understandable by the application and sent to the application. The interface receives responsive information from the application server, such as responsive information including function objects and application objects called by the embedded tags. The interface converts the responsive information received from the application server into markup language, and transmits the converted information to the client. The session is persistent; that is, it does not end with the submission from the client to the web server.

The files that contain (HTML+special tags) are stored on the webserver. The typical sequence of events is:

1. The user using the browser either clicks on a link, or types in a URL. This request is sent from the browser to the webserver and/or the web engine.
2. The webserver and/or web engine gets the request, and loads one or more files containing a markup language and special tags.
3. The webserver and/or web engine reads the file(s), translates those special tags, and makes calls to the application server.
4. The webserver and/or web engine sends back a response to the browser. The response contains application specific data, as Siebel data, metadata information, all encoded in standard markup language (HTML). There need not be special tags in the response.

THE FIGURES

Figure 3:
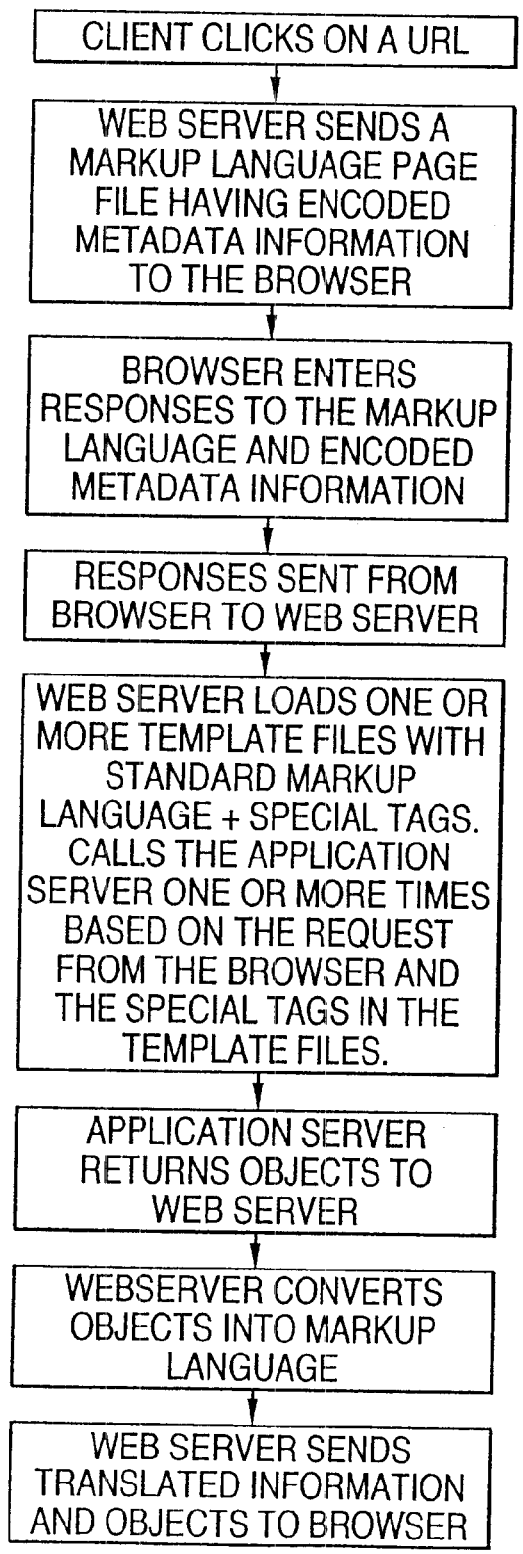

FIG. 3 shows a flow chart of the method of the invention, where the client clicks on a URL. In response to the selected URL, the web server sends a markup language page file to the browser. The browser enters responses to the markup. These responses are sent from browser to web server. The web server sends the responses to the application server. The application server returns objects to web server. The web server converts these objects into markup language, and server sends translated information and objects to the browser.

DETAILED DESCRIPTION OF THE INVENTION

The invention provides a method and system for passing information between a client and an application server through a web server using a markup language. The elements of the system are a browser running on the client for an end user to interact, through the web server, with the application server. Specifically, as shown in FIG. 3, the client clicking on a URL on the browser screen begins the session. In response to the selected URL, the webserver and/or web engine loads one or more files containing standard markup language (typically HTML), plus special tags. The webserver and/or web engine calls the application server to get metadata plus siebel data, replaces the special tags in the file with constructs based on standard markup language. The files that contain the markup language and the special tags are stored on the webserver. The typical sequence of events is:

1. The user using the browser either clicks on a link, or types in a URL. This request is sent from the browser to the webserver and/or web engine.
2. The webserver and/or web engine gets the request, and loads one or more files containing a markup language, as HTML, plus the special tags.
3. The webserver and/or web engine reads the file(s), translates the special tags, and makes calls to the application server.
4. The webserver and/or web engine sends back a response to the browser. The response contains application specific data, as Siebel data, metadata information, all encoded in standard markup language, as HTML. There are no special tags in the response.

These responses are sent from browser to web server, for example in URL command language. The web server translates or otherwise converts the responses into a suitable form for the application server, and sends the responses to the application server. The application server returns objects to web server. The web server converts these objects into markup language, and the web server then sends translated information and objects to the browser. Thus, according to our invention the end user enters information to send to the application server and receives information from the application server. The method and system of the invention further includes an application server containing application resources; and a web server providing communications between the application server and the browser. The system also includes an interface application program running on the web server. This interface application program sends a markup language form, including encoded metadata information, to the client, and receives information, including responses to the encoded metadata information, from the client in response to the markup language form.

This information is sent from the web server to the application server based upon the information received from the client, including the information that is in response to encoded metadata information. The interface receives responsive information from the application server. This responsive information includes function objects, data objects, and application objects called by the embedded tags. This information received from the application server is converted into markup language, and transmitted to the client.

Figure 1:
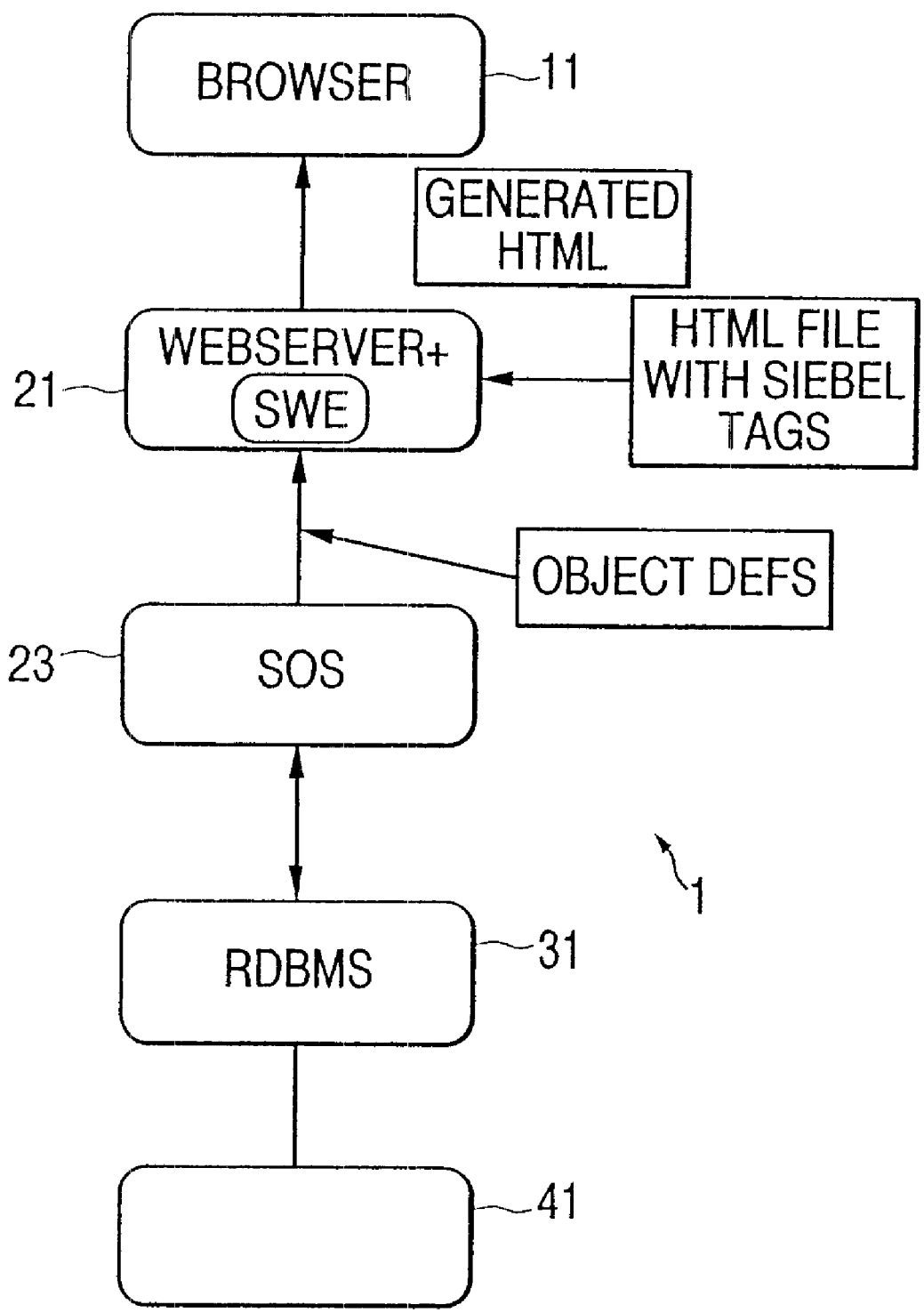
FIG. 1 is a schematic view of the system of our invention, including the browser, the web server, the application server, and the database. Also shown is the generated HTML view at the browser, the HTML file with tags as an input to the web server, and the object definitions as an input to the web server.

The run time environment of the method and system of our invention is a Thin Client-Server system, such as an HTML Thin Client-Server system. It includes the components shown in FIG. 1. Specifically, the system 1 includes one or more browsers 11. Typically, the browsers are running on remote machines connected over an internet, an intranet, a wide area network, or a local area network, and may thus be characterized as being located remotely on other machines. The system also includes a web server 21 with a web engine 23, as a Siebel Web Engine (SWE), as a component running within the web server 21. Finally, the system includes an application server 31, such as a Siebel Object Manager (SOM). Typically, the application server 31 is a separate process that can run either remotely or on the same machine 21 as the web server 23. The web server 23 communicates with the application server 31 to run applications on the application server 31, for example to read and write data to a database 41, or to engage in financial, marketing, sales, system administration, or e-commerce applications. When the application server 31 accesses a database 41, the database may be a relational database 41.

According to the invention, the web engine 23 defines a set of tags that end users can embed within a normal HTML file. The HTML file is an otherwise ordinary HTML file. It can contain HTML, or Javascript, or VBscript or XML. The tags provide directives to the web engine 23 as to what data to fetch, and where and how to incorporate the fetched data with the rest of the HTML page.

The tags of our invention provide fine-grain integration between and control of the data, and the rest of the HTML page. This fine-grained integration and control is important, because aesthetics of a web page, and the scalability and flexibility of schema and metadata in the underlying databases, as well as what data are fetched, presented, and integrated are important to customers.

The specific format of the tags is not critical. However, to preserve the programming paradigm of HTML, the tags can have for format <TagCall TagNameCall="TagName"/> where TagCall indicates that the command inside the braces is a tag call, TagNameCall indicates the name of the object being called, and "/" ends the tag. For example, in the embedded tag <siebelApplet siebelName="Opportunity List Applet"/>

"siebelApplet" indicates that the embedded tag is a call of a Siebel Applet object, SiebelName indicates that the name of the applet follows after the equal sign inside the quotation marks, Opportunity List Applet is the applet, and / indicates the end of the embedded tag.

At runtime, the tags specify what objects, e.g. views, applets, fields, and other objects to call or fetch from the database or application server. The web engine parses the HTML file with tags, translates and reformats the information going to the application, and receives a reply from the application. After making one or more calls to the application server, the web engine constructs the final HTML page by combining the content of the template file with special tags stripped out and replaced with the referenced objects as data, and sends the final HTML page back to the browser. Throughout the above-described process, the connection between the client or browser and the web server is persistent.

Here is a typical HTML page for a view:

```
<html>
<body>
<p>
<b><font size=4 color=990000><siebelField siebelName="_title"/></font></b>
<p>
<hr>
<siebelApplet siebelName="Opportunity List Applet"/>
<hr>
<siebelApplet siebelName="Opportunity Contact Applet"/>
</body>
</html>
```

The tags <siebelApplet siebelName="Opportunity List Applet"/> and <siebelApplet siebelName="Opportunity Contact Applet"/> are embedded tags according to the invention. They are used for embedding objects within the page. In this view page, there are two tags:

* siebelField
* siebelApplet

The tag specifies the object type. In this case, we have an applet, where the name attribute specifies which applet. We also have a field, with a special, reserved name: _title.

The name of the applets must match those specified in the repository, database 41 or application server 31.

The rest of the view is written in normal HTML. The user can put in whatever HTML he wants to use. The web engine, for example, a Siebel Web Engine, will read in the file, search for the "siebel" tagged sections or other tagged sections, and replace the tagged sections with its own generated HTML. The non-tagged sections are sent to the web server as is.

Similar to the view object, an applet object will have an external HTML as well. Here is an example of a form applet HTML file.

Applets, Fields within Applets, and other objects. This is done while the hierarchical nature of the tags, thereby providing a mechanism to reference from large to small objects. Additionally, the tags provide directives to the web engine as to what data to fetch and integrate into the page.

A further aspect of our invention is that the tags are integrated closely into the native file format. For purposes of illustration only, it is HTML. In fact, the markup language does not have to be HTML, but can be any text file format, e.g. XML, that the Tags can be integrated closely into. The Web Engine parses the file, strips out only the embedded tags, and replaces them with data or other objects. The rest of the text is passed through as is. Therefore, customer responses and input can be integrated tightly with native file format, HTML in this instance.

The tags are closely integrated with the native text file format, and the web engine passes through any text other than the tags. In this way, end users can easily, and flexibly construct different kinds of pages: read only text, text in table format, comma separated list format, bullet list format, a query page, a sort page, a page to edit data in, etc.

One aspect of the invention is that the tags are not simply translated by the web engine into objects, such as data objects. Some tags are translated into, for example, links.

```
<b><font size=4 color=990000><siebelField siebelName="_title"/></font></b>
<p>
<table width="100%" cellpadding=2 cellspacing=3 border=0>
<tr>
    <td align=right valign=top>
    <font size=2 face =arial><b><siebelField siebelName="labelAccount"/></b></font>
    </td>
    <td align=left valign=top>
       <siebelField siebelName="Account"/>
    </td>
    <td align=right valign=top>
       <font size=2 face=arial><b><siebelField siebelName="labelSite"/></b></font>
    </td>
    <td align=left valign=top>
       <siebelField siebelName="Site"/>
    </td>
    <td align=right valign=top>
       <font size=2 face=arial><b><siebelField siebelName="Name"/></b></font>
    </td>
<!-Other fields omitted here . . . ->
    </tr>
</table>
```

Figure 2:
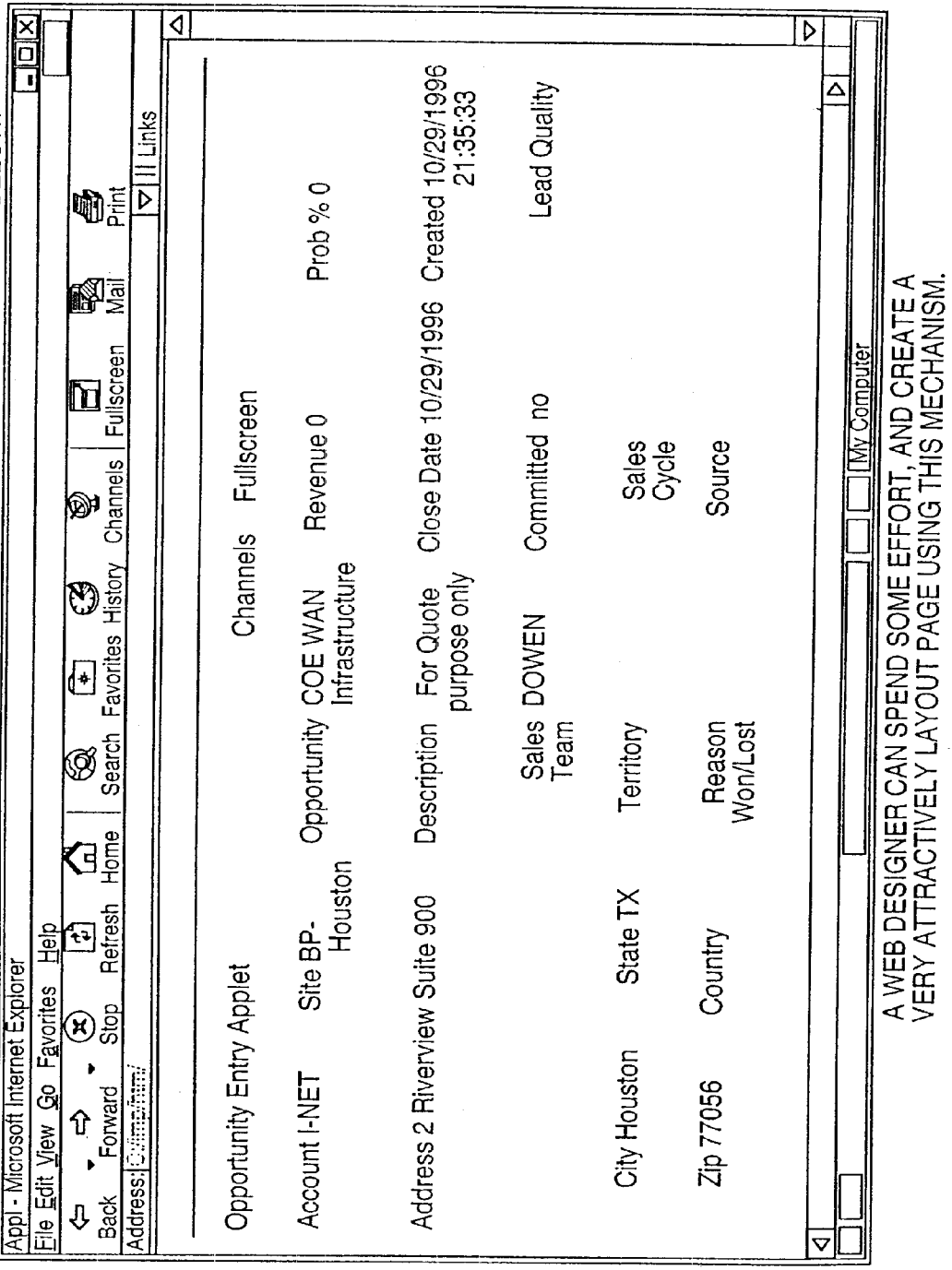
FIG. 2 shows a screen view of the web page produced by the HTML code with tags of the invention, using the tag codes shown in the specification.

This HTML layout file would produce a page as shown in FIG. 2.

A web designer can spend some effort, and create a very attractive page layout using this mechanism.

The tags provide a mechanism to uniquely identify Objects in a Repository from large to small. E.g., Views, When a user clicks on the thusly created links, the web engine or web server created links will supply the browser with information about what page, and objects (in the hierarchy) to fetch from the web server called by the link.

Other tags, such as the tag <siebelMethod> can provide directives to web engine to create many different kinds of links or buttons with actions to go back to the web server. Examples of SiebelMethods include: Navigate, EnterQuery, EnterSort, NewRecord, EditRecord, CommitRecord, PickPopup, etc.

A still further aspect of the method and system of the invention is that it defines and extends a command language in URL format. The command language can uniquely identify large or small objects in the database, and determine or specify what action/command the web engine is to perform on the objects. The use of the URL formats serves two purposes. First, it is an intermediate format to translate the tags into. Second, URL is a command language understood by the web engine to perform operations on the application server.

While the invention has been described with respect to certain preferred embodiments and exemplifications, it is not intended to limit the scope of the invention thereby, but solely by the claims appended hereto.

I claim:

1. Computer executable software code for passing information between a client browser and an application server, said software code comprising:

code to send a markup language form including encoded metadata information to the client browser;

code to receive information in response to the encoded metadata information;

code to load one or more template files including embedded tags based upon the information received from the client;

code to retrieve one or more objects stored on the application server, wherein the one or more objects are called by the embedded tags;

code to convert the one or more objects into markup language; and code to transmit the markup language to the client browser.

2. The software code of claim 1, wherein information is exchanged with the client browser via a persistent connection.

3. The software code of claim 2, wherein the objects are selected from the group consisting of views, applets, fields, data, and links.

4. The software code of claim 1, wherein at least a portion of the software code is resident on a web server.

5. The software code of claim 1, wherein the embedded tags have the format <TagCall TagNameCall="TagName"/> where TagCall indicates that the command inside the braces is a tag call, TagNameCall indicates the name of the object being called, TagName is the name of the tag being called, and "/" ends the tag.

6. The software code of claim 1, wherein the one or more objects are selected from the group consisting of function objects, data objects, and application objects.

7. The software code of claim 1, wherein the objects are selected from the group consisting of views, applets, fields, data, and links.

8. A web server for passing information between a client browser and an application server comprising:

means for sending a markup language form including encoded metadata information to the client browser;

means for receiving information in response to the encoded metadata information;

means for loading one or more template files including embedded tags based upon the information received from the client;

means for retrieving one or more objects stored on the application server, wherein the one or more objects are called by the embedded tags;

means for converting the one or more objects into markup language; and means for transmitting the markup language to the client browser.

9. The web server of claim 8, wherein a persistent connection is established between the web server and the client browser.

10. The web server of claim 9, wherein the objects are selected from the group consisting of views, applets, fields, data, and links.

11. The web server of claim 8, wherein the embedded tags have the format <TagCall TagNameCall="TagName"/> where TagCall indicates that the command inside the braces is a tag call, TagNameCall indicates the name of the object being called, TagName is the name of the tag being called, and "/" ends the tag.

12. The web server of claim 8, wherein the one or more objects are selected from the group consisting of function objects, data objects, and application objects.

13. The web server of claim 8, wherein the objects are selected from the group consisting of views, applets, fields, data, and links.

14. A method for passing information between a client browser and an application server comprising:

sending a markup language form including encoded metadata information to the client browser;

receiving information in response to the encoded metadata information;

loading one or more template files including embedded tags based upon the information received from the client;

retrieving one or more objects stored on the application server, wherein the one or more objects are called by the embedded tags;

converting the one or more objects into markup language; and transmitting the markup language to the client browser.

15. The method of claim 14, further comprising establishing a persistent connection with the client browser.

16. The method of claim 15, wherein the objects are selected from the group consisting of views, applets, fields, data, and links.

17. The method of claim 14, wherein the embedded tags have the format <TagCall TagNameCall="TagName"/> where TagCall indicates that the command inside the braces is a tag call, TagNameCall indicates the name of the object being called, TagName is the name of the tag being called, and "/" ends the tag.

18. The method of claim 14, wherein the one or more objects are selected from the group consisting of function objects, data objects, and application objects.

19. The method of claim 14, wherein the objects are selected from the group consisting of views, applets, fields, data, and links.

* * * * *

UNITED STATES PATENT AND TRADEMARK OFFICE
CERTIFICATE OF CORRECTION

PATENT NO. : 6,604,128 B2
DATED : August 5, 2003
INVENTOR(S) : Thanh Diec

It is certified that error appears in the above-identified patent and that said Letters Patent is hereby corrected as shown below:

<u>Title page,</u>
Item [56], References Cited, OTHER PUBLICATIONS,
""CGI: Common Gateway Interface," http://www.hoo-hoo.ncsa.uiuc.edu/cgi8/primer.html, (Printed from Website on Nov. 5, 1999), p 1-13" should be -- "CGI: Common Gateway Interface," http://www.hoo-hoo.ncsa.uiuc.edu/cgi8/primer.html, (Printed from Website on Nov. 5, 1999), p 1-3 --

Signed and Sealed this

Twenty-fifth Day of November, 2003

JAMES E. ROGAN
*Director of the United States Patent and Trademark Office*